(12) United States Patent
Selevan et al.

(10) Patent No.: US 11,706,861 B2
(45) Date of Patent: *Jul. 18, 2023

(54) DEVICES AND METHODS FOR SYNCHRONIZED SIGNALING OF THE POSITIONS OF MOVING PEDESTRIANS OR VEHICLES

(71) Applicants: James R. Selevan, Laguna Beach, CA (US); Adam Jordan Selevan, Laguna Beach, CA (US); Daniel Joseph Selevan, Laguna Beach, CA (US)

(72) Inventors: James R. Selevan, Laguna Beach, CA (US); Adam Jordan Selevan, Laguna Beach, CA (US); Daniel Joseph Selevan, Laguna Beach, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/321,480

(22) Filed: May 16, 2021

(65) Prior Publication Data

US 2021/0370822 A1    Dec. 2, 2021

Related U.S. Application Data

(63) Continuation of application No. 16/848,529, filed on Apr. 14, 2020, now Pat. No. 11,013,091, which is a
(Continued)

(51) Int. Cl.
*B60Q 1/30* (2006.01)
*B60Q 5/00* (2006.01)
(Continued)

(52) U.S. Cl.
CPC .............. *B60Q 1/30* (2013.01); *B60Q 1/46* (2013.01); *B60Q 5/00* (2013.01); *B62J 3/00* (2013.01);
(Continued)

(58) Field of Classification Search
CPC ..... B60Q 1/30; B60Q 1/46; B60Q 5/00; B62J 3/00; B62J 3/10; B62J 6/01; B62J 6/015;
(Continued)

(56) References Cited

U.S. PATENT DOCUMENTS 3,500,378 A    3/1970    Pickering et al.
3,787,867 A    1/1974    Dodge et al.
(Continued)

FOREIGN PATENT DOCUMENTS

CN    102147954 A    8/2011
CN    105812673 A    7/2016
(Continued)

OTHER PUBLICATIONS

Finley, M.D. et al., "Sequential Warning Light System for Work Zone Lane Closures," Texas Transportation System, (2011) pp. 1-23.
(Continued)

*Primary Examiner* — Mohamed Barakat
(74) *Attorney, Agent, or Firm* — Robert D. Buyan; Stout, Uxa & Buyan, LLP

(57) ABSTRACT

Position indicating devices, systems and methods useable for signaling the positions of pedestrians or vehicles.

18 Claims, 5 Drawing Sheets

Related U.S. Application Data continuation of application No. 16/029,379, filed on Jul. 6, 2018, now Pat. No. 10,660,183.

(60) Provisional application No. 62/529,423, filed on Jul. 6, 2017.

(51) Int. Cl.
| | |
|---|---|
| *G08G 1/16* | (2006.01) |
| *B60Q 1/46* | (2006.01) |
| *H05B 47/155* | (2020.01) |
| *H05B 47/16* | (2020.01) |
| *H05B 47/19* | (2020.01) |
| *B62J 6/01* | (2020.01) |
| *B62J 6/015* | (2020.01) |
| *B62J 6/165* | (2020.01) |
| *B62J 3/10* | (2020.01) |
| *B62J 3/00* | (2020.01) |
| *B62J 6/02* | (2020.01) |
| *B62J 27/00* | (2020.01) |
| *B62J 6/022* | (2020.01) |
| *B62J 6/028* | (2020.01) |
| *B62J 50/20* | (2020.01) |
| *B62J 50/25* | (2020.01) |

(52) U.S. Cl.
CPC . *B62J 3/10* (2020.02); *B62J 6/01* (2020.02); *B62J 6/015* (2020.02); *B62J 6/02* (2013.01); *B62J 6/165* (2020.02); *B62J 27/00* (2013.01); *G08G 1/161* (2013.01); *H05B 47/155* (2020.01); *H05B 47/16* (2020.01); *H05B 47/19* (2020.01); *B62J 6/022* (2020.02); *B62J 6/028* (2020.02); *B62J 50/20* (2020.02); *B62J 50/25* (2020.02)

(58) Field of Classification Search
CPC ..... B62J 6/02; B62J 6/165; B62J 27/00; B62J 6/022; B62J 6/028; B62J 50/20; B62J 50/25; G08G 1/161; H05B 47/155; H05B 47/16; H05B 47/19
See application file for complete search history.

(56) References Cited

U.S. PATENT DOCUMENTS

| | | | |
|---|---|---|---|
| 3,846,672 A | 11/1974 | Doughty | |
| 4,132,983 A | 1/1979 | Shapiro | |
| 4,249,159 A | 2/1981 | Stasko | |
| 4,345,305 A | 8/1982 | Kolm et al. | |
| 4,827,245 A | 5/1989 | Lipman | |
| 4,841,278 A | 6/1989 | Tezuka et al. | |
| 5,294,924 A | 3/1994 | Dydzyk | |
| 5,345,232 A | 9/1994 | Robertson | |
| 5,428,546 A | 6/1995 | Shah et al. | |
| 5,438,495 A | 8/1995 | Ahlen et al. | |
| 5,551,370 A | 9/1996 | Hwang | |
| 5,673,039 A | 9/1997 | Pietzsch et al. | |
| 5,754,124 A | 5/1998 | Daggett et al. | |
| 6,299,379 B1 | 10/2001 | Lewis | |
| 6,332,077 B1 | 12/2001 | Wu et al. | |
| 6,486,797 B1 | 11/2002 | Laidman | |
| 6,549,121 B2 | 4/2003 | Povey et al. | |
| 6,614,358 B1 | 9/2003 | Hutchison et al. | |
| D498,164 S | 11/2004 | Delich | |
| 6,929,378 B2 | 8/2005 | Wang | |
| D510,289 S | 10/2005 | Dueker et al. | |
| 6,963,275 B2 | 11/2005 | Smalls | |
| D515,957 S | 2/2006 | Dueker et al. | |
| D515,958 S | 2/2006 | Dueker et al. | |
| 7,088,222 B1 | 8/2006 | Dueker et al. | |
| 7,106,179 B1 | 9/2006 | Dueker et al. | |
| 7,182,479 B1 | 2/2007 | Flood et al. | |
| 7,277,809 B1 | 10/2007 | DeWitt, Jr. et al. | |
| 7,298,244 B1 | 11/2007 | Cress et al. | |
| 7,301,469 B1 | 11/2007 | Hoffman et al. | |
| D560,533 S | 1/2008 | Dueker et al. | |
| D564,387 S | 3/2008 | Rubin et al. | |
| 7,455,419 B2 | 11/2008 | Helget et al. | |
| 7,563,158 B2 | 7/2009 | Haschke et al. | |
| D631,582 S | 1/2011 | Hwang | |
| 8,072,345 B2 | 12/2011 | Gallo | |
| D654,387 S | 2/2012 | Wilson et al. | |
| 8,154,424 B2 | 4/2012 | Selevan | |
| 8,220,950 B1 | 7/2012 | Sunshine | |
| D669,805 S | 10/2012 | Edwards et al. | |
| D678,100 S | 3/2013 | Hwang | |
| 8,550,653 B2 | 10/2013 | Wilson et al. | |
| 8,564,456 B2 | 10/2013 | Selevan | |
| 8,579,460 B2 | 11/2013 | Wilson et al. | |
| 8,602,584 B2 | 12/2013 | Ghafoori et al. | |
| 8,643,511 B1 | 2/2014 | Batterson | |
| 8,672,517 B2 | 3/2014 | Chung et al. | |
| 8,770,774 B2 | 7/2014 | Ye et al. | |
| 8,786,461 B1 | 7/2014 | Daudelin | |
| 8,949,022 B1 | 2/2015 | Fahrner et al. | |
| 9,066,383 B2 | 6/2015 | Gerszberg | |
| 9,122,966 B2 * | 9/2015 | Glaser | G06V 40/70 |
| 9,288,088 B1 | 3/2016 | McIlroy | |
| 9,437,109 B1 | 9/2016 | Stafford et al. | |
| 9,489,809 B1 | 11/2016 | Dever et al. | |
| D778,752 S | 2/2017 | Selevan | |
| D778,753 S | 2/2017 | Selevan | |
| 9,835,319 B2 | 12/2017 | Selevan et al. | |
| 10,066,808 B2 | 9/2018 | Fernando | |
| 10,443,828 B2 | 10/2019 | Selevan et al. | |
| 2002/0006313 A1 | 1/2002 | Pas | |
| 2002/0008637 A1 | 1/2002 | Lemelson et al. | |
| 2002/0036908 A1 | 3/2002 | Pederson | |
| 2002/0067290 A1 | 6/2002 | Peet, II et al. | |
| 2002/0115423 A1 | 8/2002 | Hatae et al. | |
| 2002/0154787 A1 | 10/2002 | Rice et al. | |
| 2002/0159251 A1 | 10/2002 | Hart | |
| 2002/0175831 A1 | 11/2002 | Bergan et al. | |
| 2003/0164666 A1 | 9/2003 | Crunk | |
| 2004/0056779 A1 | 3/2004 | Rast | |
| 2004/0100396 A1 | 5/2004 | Antico et al. | |
| 2004/0113817 A1 | 6/2004 | Novak et al. | |
| 2004/0124993 A1 | 7/2004 | George | |
| 2004/0183694 A1 | 9/2004 | Bauer | |
| 2004/0263330 A1 | 12/2004 | Alarcon | |
| 2004/0264440 A1 | 12/2004 | Wan et al. | |
| 2005/0040970 A1 | 2/2005 | Hutchins et al. | |
| 2005/0134478 A1 | 6/2005 | Mese et al. | |
| 2005/0210722 A1 | 9/2005 | Graef et al. | |
| 2005/0248299 A1 | 11/2005 | Chemel et al. | |
| 2005/0254246 A1 | 11/2005 | Huang | |
| 2006/0072306 A1 | 4/2006 | Woodyard | |
| 2006/0097882 A1 | 5/2006 | Brinkerhoff et al. | |
| 2006/0104054 A1 | 5/2006 | Coman | |
| 2006/0165025 A1 | 7/2006 | Singh et al. | |
| 2007/0038743 A1 | 2/2007 | Hellhake et al. | |
| 2007/0099625 A1 | 5/2007 | Rosenfeld | |
| 2007/0115139 A1 | 5/2007 | Witte et al. | |
| 2007/0153520 A1 | 7/2007 | Curran et al. | |
| 2007/0155139 A1 | 7/2007 | Hecht et al. | |
| 2007/0194906 A1 | 8/2007 | Sink | |
| 2007/0222638 A1 | 9/2007 | Chen et al. | |
| 2007/0222640 A1 | 9/2007 | Guelzow et al. | |
| 2007/0250212 A1 | 10/2007 | Halloran et al. | |
| 2007/0273509 A1 | 11/2007 | Gananathan | |
| 2007/0273552 A1 | 11/2007 | Tischer | |
| 2008/0037431 A1 | 2/2008 | Werb et al. | |
| 2008/0042866 A1 | 2/2008 | Morse et al. | |
| 2008/0091304 A1 | 4/2008 | Ozick et al. | |
| 2008/0122607 A1 | 5/2008 | Bradley | |
| 2008/0122656 A1 | 5/2008 | Carani et al. | |
| 2008/0150758 A1 | 6/2008 | Vallejo Sr. | |
| 2008/0198038 A1 | 8/2008 | Yingst et al. | |
| 2008/0242220 A1 | 10/2008 | Wilson et al. | |
| 2008/0267259 A1 | 10/2008 | Budampati et al. | |

(56) References Cited

U.S. PATENT DOCUMENTS

| | | |
|---|---|---|
| 2009/0009406 A1 | 1/2009 | Chu et al. |
| 2009/0034258 A1 | 2/2009 | Tsai et al. |
| 2009/0034419 A1 | 2/2009 | Flammer, III et al. |
| 2009/0063030 A1 | 3/2009 | Howarter et al. |
| 2009/0115336 A1 | 5/2009 | Wang |
| 2009/0174572 A1 | 7/2009 | Smith |
| 2009/0187300 A1 | 7/2009 | Everitt |
| 2010/0109898 A1 | 5/2010 | Kensy et al. |
| 2010/0259199 A1 | 10/2010 | McDermott |
| 2011/0010094 A1 | 1/2011 | Simon |
| 2011/0128161 A1* | 6/2011 | Bae .................. B60Q 5/006 |
| | | 340/901 |
| 2011/0249430 A1 | 10/2011 | Stamatatos et al. |
| 2011/0249688 A1 | 10/2011 | Liu |
| 2012/0051056 A1 | 3/2012 | Derks et al. |
| 2012/0139425 A1 | 6/2012 | Kim |
| 2012/0249341 A1 | 10/2012 | Brown et al. |
| 2012/0256765 A1 | 10/2012 | Selevan |
| 2012/0277934 A1 | 11/2012 | Ohtomo et al. |
| 2012/0287611 A1 | 11/2012 | Wilson et al. |
| 2013/0113634 A1 | 5/2013 | Hutchinson et al. |
| 2013/0114268 A1 | 5/2013 | Shigematsu et al. |
| 2013/0166193 A1 | 6/2013 | Goldman et al. |
| 2013/0214924 A1 | 8/2013 | Ko |
| 2013/0221852 A1 | 8/2013 | Bowers et al. |
| 2013/0260695 A1 | 10/2013 | Wang |
| 2013/0271294 A1* | 10/2013 | Selevan .............. G08G 1/095 |
| | | 340/907 |
| 2013/0293396 A1 | 11/2013 | Selevan |
| 2014/0071681 A1 | 3/2014 | Ghafoori et al. |
| 2014/0126187 A1 | 5/2014 | Bennett et al. |
| 2014/0210373 A1 | 7/2014 | Baret |
| 2015/0009682 A1 | 1/2015 | Clough |
| 2015/0077234 A1 | 3/2015 | Fullam |
| 2015/0117010 A1 | 4/2015 | Auen |
| 2015/0330616 A1 | 11/2015 | Preuschl et al. |
| 2015/0338079 A1 | 11/2015 | Preuschl et al. |
| 2015/0366275 A1 | 12/2015 | Cserfoi |
| 2015/0369456 A1 | 12/2015 | Creusen et al. |
| 2016/0144778 A1 | 5/2016 | Tucker |
| 2016/0174099 A1* | 6/2016 | Goldfain ............ A61B 5/6831 |
| | | 375/130 |
| 2016/0186971 A1 | 6/2016 | Selevan et al. |
| 2016/0248506 A1 | 8/2016 | Ryan et al. |
| 2017/0097128 A1 | 4/2017 | Stafford |
| 2017/0151994 A1 | 6/2017 | Braunberger |
| 2017/0160392 A1* | 6/2017 | Brisimitzakis .......... G01S 7/062 |
| 2017/0287217 A1 | 10/2017 | Kim et al. |
| 2017/0354019 A1 | 12/2017 | Julian et al. |
| 2017/0355300 A1 | 12/2017 | Kurata |
| 2018/0079463 A1 | 3/2018 | Pearce |
| 2018/0165965 A1* | 6/2018 | Ewert .................. H04W 4/40 |
| 2019/0132709 A1 | 5/2019 | Graefe et al. |

FOREIGN PATENT DOCUMENTS

| | | |
|---|---|---|
| DE | 102008011228 A1 | 8/2009 |
| EP | 1531444 A2 | 5/2005 |
| JP | 03-162279 A | 7/1991 |
| JP | 06-024012 U | 3/1994 |
| JP | 11260102 A | 9/1999 |
| JP | 2005-019013 A | 1/2005 |
| JP | 3108195 U | 4/2005 |
| JP | 2005113636 A | 4/2005 |
| JP | 2010/157213 A | 7/2010 |
| JP | 3208109 U | 12/2016 |
| TW | 201528878 A | 7/2015 |
| WO | WO 98/21519 A1 | 5/1998 |
| WO | WO 2003/026358 A1 | 3/2003 |
| WO | WO2005/015520 A1 | 2/2005 |
| WO | WO 2007/030852 A1 | 3/2007 |
| WO | WO 2009/111184 A2 | 9/2009 |
| WO | WO2012/002163 A1 | 1/2012 |
| WO | WO 2014/099953 A1 | 6/2014 |
| WO | WO 2014/115541 A1 | 7/2014 |
| WO | WO 2014/130842 A1 | 8/2014 |
| WO | WO 2016/070193 A1 | 5/2016 |
| WO | WO2016/077812 A1 | 5/2016 |

OTHER PUBLICATIONS

Sun, C. et al., "Cost-Benefit Analysis of Sequential Warning Lights in Nighttime Work Zone Tapers", University of Missouri, Report to the Smart Work Zone Deployment Initiative, Jun. 6, 2011.

Internet Website Screen Capture, www.empco-lite.com; Sep. 6, 2010.

PCT International Search Report dated Apr. 27, 2018 in PCT Application No. PCT/US2018/017683.

International Search Report and Written Opinion dated May 28, 2014 in PCT Application US2014/017756. International Filing Date Feb. 21, 2014.

PCT International Search Report dated Mar. 18, 2016 in PCT Application No. PCT/US2015/060770.

PCT International Search Report dated Oct. 26, 2018 in related PCT Application No. PCT/US2018/041126.

Extended European Search Report dated Jun. 20, 2018 in related European Application No. 15858697.4.

Office Action dated Oct. 23, 2019 in related Japanese Patent Application No. 2017-544855.

Non-Final Office Action dated Mar. 17, 2011 in U.S. Appl. No. 12/381,565.

Non-Final Office Action dated Nov. 8, 2012 in U.S. Appl. No. 13/440,930.

Non-Final Office Action dated Oct. 8, 2014 in U.S. Appl. No. 13/774,029.

Non-Final Office Action dated Aug. 11, 2014 in U.S. Appl. No. 13/775,177.

Final Office Action dated May 8, 2015 in U.S. Appl. No. 13/774,029.

Final Office Action dated Mar. 30, 2015 in U.S. Appl. No. 13/775,177.

Non-Final Office Action dated Sep. 18, 2015 in U.S. Appl. No. 13/775,177.

Non-Final Office Action dated Mar. 25, 2015 in U.S. Appl. No. 14/186,582.

Non-Final Office Action dated Jan. 7, 2020 in U.S. Appl. No. 16/522,282.

Non-Final Office Action dated Jan. 17, 2020 in U.S. Appl. No. 16/573,762.

Non-Final Office Action dated Jan. 22, 2019 in U.S. Appl. No. 16/029,379.

Final Office Action dated Sep. 5, 2019 in U.S. Appl. No. 16/029,379.

Non-Final Office Action dated Nov. 30, 2016 in U.S. Appl. No. 15/177,192.

Non-Final Office Action dated Apr. 19, 2017 in U.S. Appl. No. 14/941,646.

Non-Final Office Action dated May 11, 2018 in U.S. Appl. No. 15/831,065.

Final Office Action dated Dec. 27, 2018 in U.S. Appl. No. 15/831,065.

Final Office Action dated Apr. 30, 2020 in U.S. Appl. No. 16/522,282.

Extended European Search Report dated Dec. 2, 2020 in related European Application No. 18751574.7.

Car 2 Car Communications Consortium: "Car 2 Car Communication Consortium Manifesto; Overview of the C2C-CC System, Version 1.1", Internet Citation, Aug. 2007, pp. 1-94, Retrieved from the Internet: URL:http://www.car-to-car.org/fileadmin/downloads/C2C-CC_manifesto.v1.1.pdf.

Jiang, Daniel et al., "Design of 5.9 ghz dsrc-based vehicular safety communication", IEEE Wireless Communications, Coordinated Science Laboratory; Dept. Electrical and Computer Engineering, University of Illinois at Urbana-Champaign, US, vol. 13, No. 5, Oct. 2006, pp. 36-43.

Caveney, Derek,"Cooperative Vehicular Safety Applications", IEEE Control Systems Magazine, IEEE Service Center, Piscataway, NJ, US, vol. 30, No. 4, Aug. 2010, pp. 38-53.

Boukerche, A. et al, "Vehicular Ad Hoc Networks: A New Challenge for Localization-Based Systems", Computer Communications, Elsevier Science Publishers, vol. 31, No. 12, Jul. 2008, pp. 2838-2849.

(56) References Cited

OTHER PUBLICATIONS

Rola Naja, "Wireless Vehicular Networks for Car Collision Avoidance", in "Wireless Vehicular Networks for Car Collision Avoidance", May 2013, Springer Verlag, retrieved from the Internet: URL:https://www.springer.com/de/book/9871441995629.
Extended European Search Report dated Mar. 2, 2021 in related European Application No. 18828265.1.
Office Action dated Mar. 3, 2021 in corresponding Chinese Patent Application No. 201880057575.3.
PCT International Search Report dated Jul. 22, 2021 in PCT Application No. PCT/US2021/012872.
Office Action dated Oct. 21, 2021 in corresponding European Patent Application No. 18751574.7.
Office Action dated Oct. 11, 2021 in corresponding Chinese Patent Application No. 201880057575.3.
Office Action dated Jan. 11, 2022 in related Japanese Patent Application No. 2019-543284.
Liu, Zhitian et al., "Efficient Single-Layer White Light-Emitting Devices Based on Silole-Containing Polymers," Journal of Display Technology, Mar. 2013.
Office Action dated Feb. 7, 2023 in related Japanese Patent Application No. 2022-068386.

\* cited by examiner

DEVICES AND METHODS FOR SYNCHRONIZED SIGNALING OF THE POSITIONS OF MOVING PEDESTRIANS OR VEHICLES

RELATED APPLICATION

This application is a continuation of U.S. patent application Ser. No. 16/848,529 entitled *Devices and Methods for Synchronized Signaling of the Positions of Moving Pedestrians or Vehicles* filed Apr. 14, 2020 and issuing on May 18, 2021 as U.S. Pat. No. 11,013,091, which is a continuation of U.S. patent application Ser. No. 16/029,379 entitled *Devices and Methods for Synchronized Signaling of the Positions of Moving Pedestrians or Vehicles* filed on Jul. 6, 2018 and issued on May 19, 2020 as U.S. Pat. No. 10,660,183, which claims priority to U.S. Provisional Patent Application No. 62/529,423 entitled *Synchronized Behavior of Bicycle, Motorcycle, and Pedestrian Warning Devices* filed on Jul. 6, 2017, the entire disclosure of each such application being expressly incorporated herein by reference.

FIELD OF THE INVENTION

The present invention relates generally to the fields of electronics and traffic engineering and more particularly to systems and methods for transmitting visibility-enhancing or warning signals from group(s) of moving pedestrians or vehicles.

BACKGROUND

Pursuant to 37 CFR 1.71(e), this patent document contains material which is subject to copyright protection and the owner of this patent document reserves all copyright rights whatsoever.

Pedestrians (e.g., runners, joggers, walkers, etc.) and occupants of certain vehicles (e.g., bicyclists, motorcyclists, drivers of slower-moving or otherwise vulnerable vehicles) can be susceptible to injury due to vehicular impact. Such pedestrians and vehicles sometimes travel or move along a roadway in groups of two or more. For example, a peloton of bicyclists might include 20 to 50 or more riders. When spread out in the direction of travel in the early morning or evening, front and/or rear lights attached to the bicycles may flash to provide warning to approaching drivers of motor vehicles. However, to the approaching vehicle driver, this may appear from a distance as random flashing lights without giving the oncoming driver a clear appreciation of the overall size of the group.

Existing warning lamps installed on bicycles, motorcycles and other moving vehicles flash to warn approaching drivers. The individual flash of either a forward or rear facing lamp has limited energy and, therefore, limited visual light output owing to available power and reflector surface area. Improvements in efficiency (LED versus incandescent) of the light source, sophisticated optic, and improved battery technology have led to better warning lights. However, injury as a result of impact continues and with increasing frequency. There is a need for improvements in warning light optics, power, and efficiency. Pedestrians suffer the same disadvantage when walking along a roadside. Groups of children walking to school, for example, in the early morning hours of winter are difficult to see in the darkness. Flashing lamps on the backpacks, headgear, shoes or garments worn by such pedestrians can make them more visible to oncoming drivers.

In accordance with this invention, such flashing lamps may flash in synchrony or unison or otherwise emit light in synchrony or unison (e.g., solid non flashing, pattern-flashing, etc.) when several pedestrians or vehicles are moving in a group, thereby enhancing the perceived brightness and size of the emitted light and rendering the group more visible to oncoming traffic.

SUMMARY

In accordance with one aspect of the present disclosure, there are provided position indicating devices which emit synchronized position indicating signals when moving within a particular distance range (i.e., a synchronization range) of other ones of such moving devices. In some embodiments, these devices may be in the form of electronic flares which emit flashes of light or other signals, examples of such flares being described in U.S. Pat. Nos. 7,088,222; 7,106,179; 8,154,424; 8,550,653; 8,564,456; 8,579,460; 9,288,088; 9,835,319; D510,289; D515,957; D515,958; D560,533; D654,387; D669,805; D778,752 and D778,753 as well as United States Patent Application Publication Nos. 2013/0113634; 2016/0186971 and pending U.S. patent application Ser. No. 15/893,420, the entire disclosure of each such patent and application being expressly incorporated herein by reference. In some embodiments, these devices may be attached to or integrated/manufactured on or in a vehicle, vehicle accessory or other object, such as, for example, vehicles, bicycles, bicycle seats, bicycle lamps, motorcycles, motorbikes, wearable garments, vests, shoes, running shoes, headgear, caps, hats, helmets, hard hats, straps, leg straps, arm straps, belts, back-packs, lanyards, jewelry, ear rings, necklaces and wrist bands.

In accordance with another aspect of the present disclosure, there are provided position indicating devices which are operable while moving along with other such devices, wherein each such device comprises: at least one emitter which emits a position indicating signal; a radio or other receiver (which may include a transmitter as well); a power source; and electronic circuitry configured and programmed to a) receive synchronization signal(s), via the receiver, from other position indicating devices located within a synchronization range of said device; and b) in response to the receipt of one or more synchronization signal(s) from one or more other position indicating devices located within the synchronization range, causing said at least one emitter to emit a signal that is synchronized with signals being emitted by said one or more other position indicating devices located within the synchronization range.

In In accordance with another aspect of the present disclosure, there is provided a method for using a plurality of position indicating devices to indicate the positions of a plurality of moving pedestrians or vehicles, said method comprising the step of causing each of said pedestrians or vehicles to be equipped with at least one of said devices, each of said devices comprising an emitter which emits position indicating signals and control apparatus programmed to i) sense when that device is within a synchronization range of one or more of the other devices and, when within said synchronization distance range of one or more others of said devices and, ii) cause that device's emitter to emit a position indicating signal that is synchronized with position indicating signals being emitted by said one or more of the others of said devices that are positioned within the synchronization range.

Further aspects and details of the present invention will be understood upon reading of the detailed description and examples set forth herebelow.

BRIEF DESCRIPTION OF THE DRAWINGS

The following detailed description and examples are provided for the purpose of non-exhaustively describing some, but not necessarily all, examples or embodiments of the invention, and shall not limit the scope of the invention in any way.

DETAILED DESCRIPTION

Figure 1:
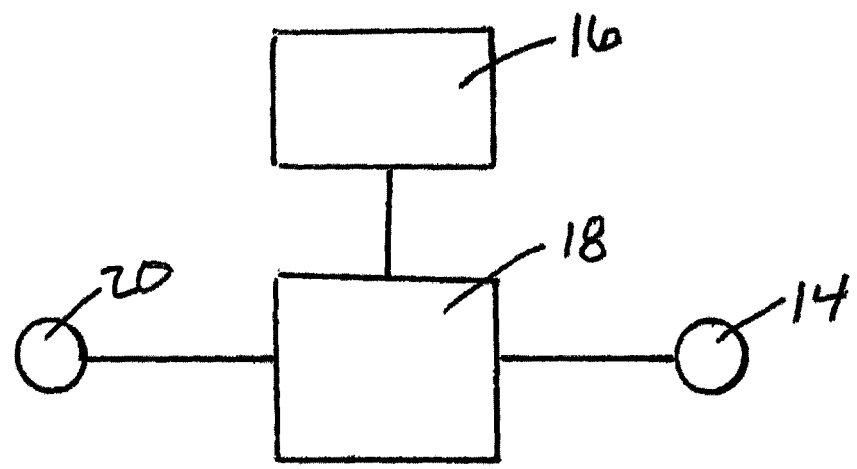
FIG. 1 is a diagram showing the elements of one embodiment of position indicating device of the present invention.

The following detailed description and the accompanying drawings to which it refers are intended to describe some, but not necessarily all, examples or embodiments of the invention. The described embodiments are to be considered in all respects only as illustrative and not restrictive. The contents of this detailed description and the accompanying drawings do not limit the scope of the invention in any way.

When several bicyclists are riding along the side of a road, their warning lamps may blend in with ambient and infrastructure lamps placed for multiple purposes. For example, light emanating from store fronts, crossing automobiles, retail buildings, etc., all will tend to obscure the flashing warning lamp of the bicyclist. Also, when vehicles attempt to travel in a group, such as a funeral procession, military vehicle convoy, etc., it is sometimes difficult for other vehicles traveling on the same roadway to visually perceive the existence or extent of such group. The present invention provides signaling devices and systems which may be embodied in, held, carried, worn or affixed to such pedestrians or vehicles and are programmed to emit synchronized position indicating signals when such pedestrians or vehicles ate moving in a group, thereby aiding visibility and perception of the group.

In another non-limiting example, the present invention provides means to enhance or multiply the safety features of bicycle or motorcycle illumination. The multiplication factor is simply the number of bicyclists in the group (peloton). Currently, each flashing lamp when not coordinated with the light output of other members of the group provides a fraction of the group's total available battery energy and light output. By providing coordination of the individual flashing lamps the "group" will appear as a much larger and brighter entity, thereby providing safety beyond that available to multiple, independently-flashing bicycles warning lamps.

This invention addresses the advantage provided by coordinating a large number of individual flashing safety lights on a group of moving nodes (for example, bicycles, motorcycles, motor homes, road-side walkers or joggers, etc.). By coordinating the flashing of LED lamps on individual nodes, the "Group" is made to appear larger and more distinctive, thereby providing a safety advantage.

Using radio, infrared, or sound communication, a mesh-network, master-slave, or hybrid communications network, the formerly independent flashing of lamps on moving and non-connected vehicles or pedestrians can be coordinated such that all the lamps flash in unison, or in sequence, or in some other more readily visible pattern.

This invention addresses the challenges associated with coordinating an action (for example, flashing of a lamp) amongst multiple, disparate moving entities. To provide for dynamic position synchrony, the network must account for positional changes as well as signal strength variations owing to multipath reflection off automobiles, trucks, and bicycles. In addition, simultaneous flashing of all the lamps requires network coordination, timing, and the ability for dynamic numbering of network nodes leaving and joining the network.

Figure 2:
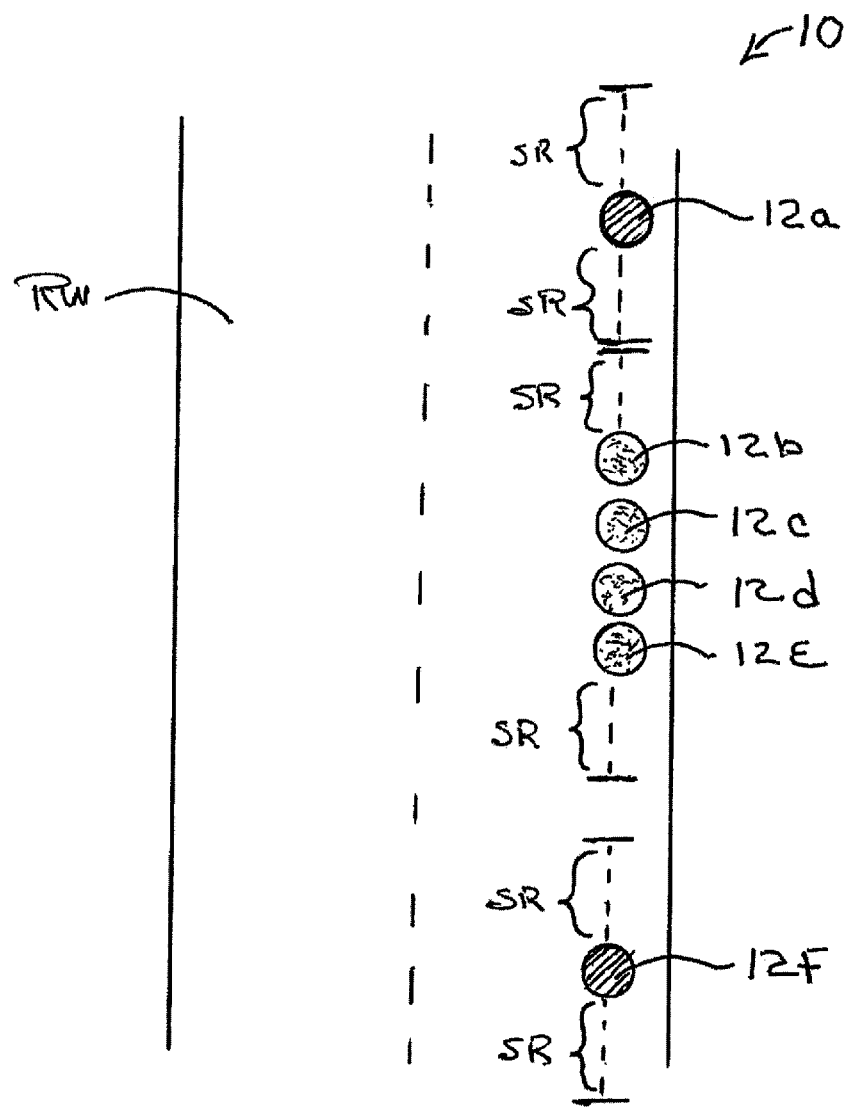
FIG. 2 is a diagram of one embodiment of a system of the present invention comprising a plurality of position indication devices as shown in FIG. 1, attached to or carried by pedestrians or vehicles moving along a roadway or other thoroughfare.

FIG. 1 shows an example of basic elements that may be included in a position indicating device 12 of the present invention. FIG. 2 shows an example of a system (e.g., a network or group) comprising a plurality of position indicating devices 12a through 12f (e.g., each device representing a separate "node") moving in a common direction along a roadway or other thoroughfare RW.

As seen in FIG. 1, each device 12 comprises at least one emitter 16 (such as an LED, other light source, speaker, horn, etc.) which emits a position indicating signal, a radio or other receiver 14 (which may in some embodiments also comprise a transmitter), a power source 20 (e.g., a battery or solar panel) and electronic circuitry 18 (e.g., an integrated circuit having a controller). The electronic circuitry 18 is configured and programmed to receive synchronization signal(s), via the receiver 14, from other such position indicating devices 12 located within a synchronization range SR of the present device 12 and, in response to the receipt of one or more synchronization signal(s) from one or more other position indicating devices 12 located within the synchronization range SR, causing the emitter(s) 16 to emit a signal that is synchronized with signals being emitted by said one or more other position indicating devices 12a through 12f located within the synchronization range SR. The emitter(s) 16 can be highly directional, omni-directional, or quasi-directional, or can be set to emit electromagnetic radiation in the visible range or a range outside the visible spectrum. Such radiation can be in the infrared, ultraviolet, microwave, or radio frequency range. Such radiation can be configured to be received by, and interact with, a receiver in an approaching or departing vehicle that can display the information on a Global Positioning System (GPS) display or other mapping device within the vehicle. Furthermore, each module supporting the visual output devices can comprise a GPS receiver that can provide its position and then transmit that position to the approaching or leaving vehicle such that the information may be used to locate one, a few, or all of the modules on a GPS display or other mapping system.

In the example shown in FIG. 2, four of the six devices 12b, 12c, 12d and 12e are within synchronization range SR of one another. Thus, devices 12b, 12c, 12d and 12e are all emitting a synchronized position indicating signal. However, non-grouped devices 12a and 12f are currently outside of the synchronization range SR of all of the other devices in the network or group and, therefore, devices 12a and 12f are either not emitting any signal, or are emitting signals which differ from or are not synchronous with the signals being emitted by the grouped devices 12b, 12c, 12d and 12e.

If one of the non-grouped devices 12a or 12f subsequently becomes within the synchronization range SR of any of the grouped devices 12b, 12c, 12d or 12e, that device will then automatically join the group and will adopt/begin to emit the synchronized position indicating signal along with the other grouped devices 12b, 12c, 12d and 12e.

If one of the grouped devices 12a, 12b, 12c, 12d moves outside of the group's synchronization range SR, that device will then then cease to emit the synchronized group position indicating signal and will either become quiescent and not emit any signal or will adopt and begin to emit a different or non-synchronized position indicating signal.

In some embodiments, the synchronized group position indicating signal emitted by the grouped devices 12b, 12c, 12d and 12e may be sequential in nature. For example, flashes of light may be emitted in sequential order from the first device 12b to the last device 12d or from the last device 12d to the first device 12a. In such sequential embodiments, if the order of the grouped devices 12b, 12c, 12d, 12e changes, the devices will be programmed to automatically re-sequence themselves to maintain the desired first-to-last or last-to-first sequence, even though the actual order of the devices within the group has changed change.

Mesh-Network

When multiple bicycles or pedestrians or other vehicles utilizing the same equipment approach each other and are within radio range, one of the radios must assume control to initiate the coordinating signal. However, this same temporary master may soon move out of range. Hence, any other node (bicycle) must be capable of assuming control. Furthermore, as all the devices are programmed exactly the same, there is no predefined "master" or "slave". The network must be able to dynamically hand off control from each member to the next. Hence, the network must act both as a master-slave and as a mesh depending upon range and conflict issues. A novel aspect of this invention is the dynamic shifting between mesh and Master-Slave topologies. A fundamental aspect of this is that all nodes when not within range of another node will, for example, flash the lamp once-per-second. However, two nodes may not be flashing in synchrony even though each is flashing at once-per-second. Once in range, each node will establish the "master" clock to synchronize the emitted signals (e.g., flashes of light).

Figure 3:
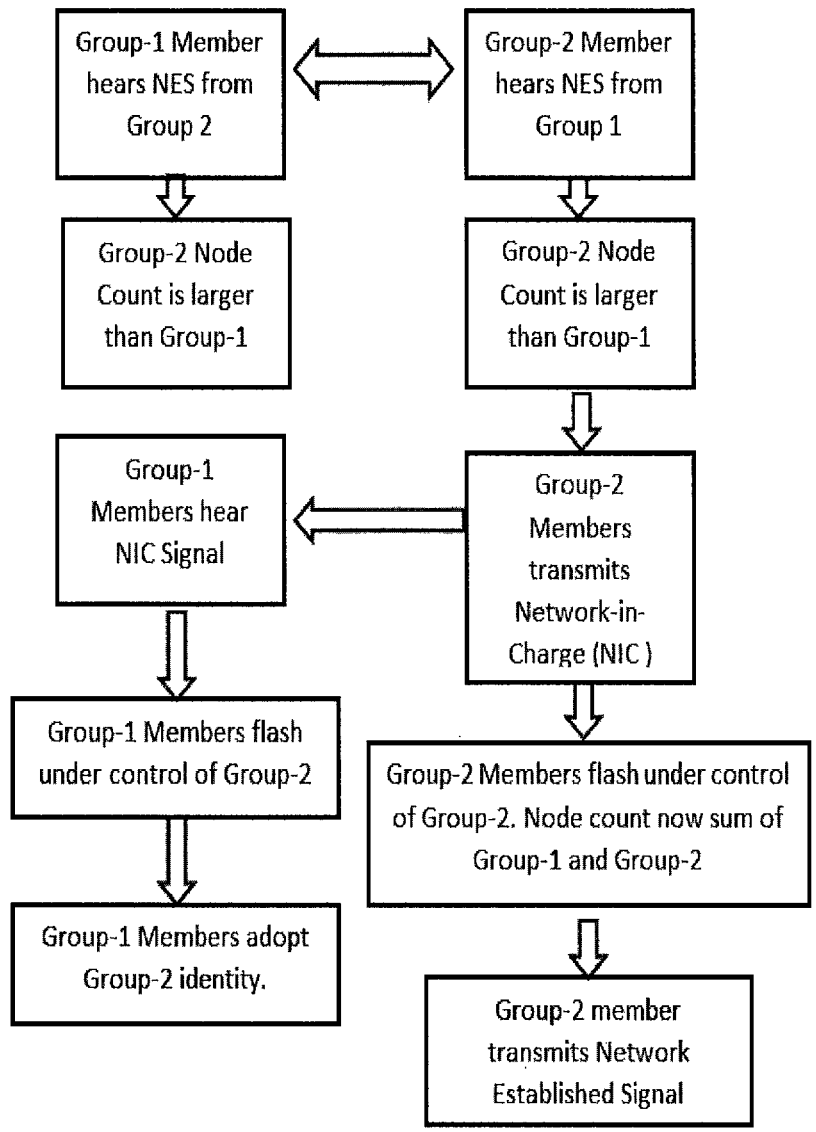
FIG. 3 is a diagram showing one non-limiting example of an operating protocol by which position indicating devices of the present invention may be programmed to operate.

With reference to FIG. 3, one example of an operating scenario is that two nodes approach within range. Each node randomly or coordinated with the LED flash transmits a signal requesting control of the network (Request-Control Signal—RCS) and seeks an acknowledgement. The first node to transmit the request-control signal will take control of the network. Upon receipt of the Request-Control Signal, the second node will a) acknowledge receipt of the signal and b) cease sending out Requests Control Signals and simply go into receive and propagate mode (mesh-network). The second of the two nodes will flash according to instructions and timing from the first (Master-Slave). Both nodes will begin to send out a Network-Established Signal (NES) that is coordinated with the LED flash. The Network-Established Signal will include flash characteristics (time, duration, frequency, etc.) and number of nodes in the network. As additional members of the group move into range, they too will be sending randomly-timed Request-Control Signals. However, the first two nodes, having already established a network, will not respond but will continue to flash and send out Network-Established Signals that includes number of nodes in the network. If a single new node moves within range it will receive a Network-Established Signal with network size=2. This Network-Establish Signal will elicit an acknowledgement that will increase the size of the network to 3 nodes. This parameter, network size, will continue to be propagated to all nodes in the network (mesh-network).

Should a similar series of events occur in an approaching group of cyclists where a network has already been established, then a potential conflict will occur. Both groups, having formed networks independently, will be transmitting Network-Establish Signals. However, one of the parameters is network size. The network with the greater number of nodes, for example (could be smaller node count takes control) will take control of the smaller network. The smaller network will continue transmitting Network-Establish Signals but with a) a new node number that includes the sum of both groups; b) adopt the NES identifier of the larger group; and c) in unison with the larger group.

Merging of Networks

Figure 4:
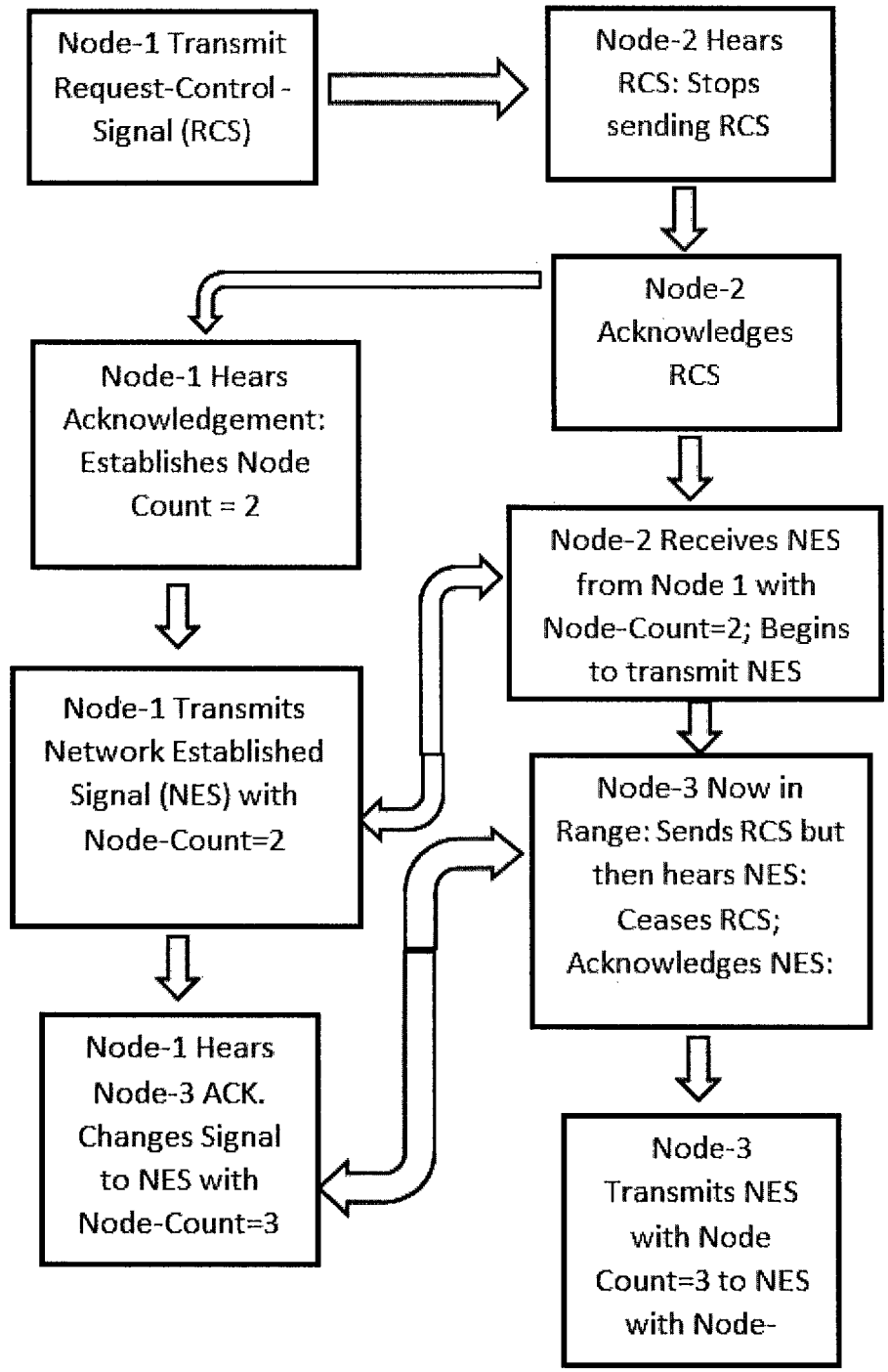
FIG. 4 is a diagram showing a protocol by which position indicating devices of the present invention may be programmed to distinguish between separate groups of pedestrians or vehicles which pass or come near each other.
Figure 5:
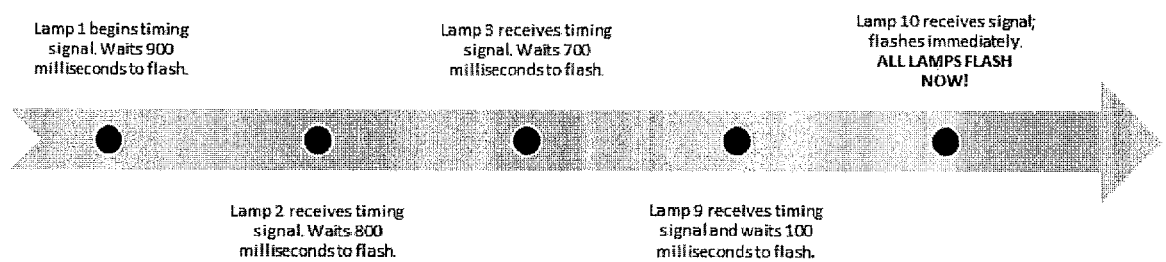
FIG. 5 is a diagram showing one non-limiting example of a mesh network or "master-slave" network which may be used in devices of the present invention.

Referring to FIG. 4, a group of nodes (bicyclists, for example) having formed a network (group) may now come upon another group of nodes also operating as a group. When a device in Group-1 receives a Network Established Signal (NES) from Group-2, the member will compare the node count transmitted by Group-2 with that transmitted from within its own Group-1. (The same is taking place with the Group-2 member). If the node-count of Group-2 is larger, the Group-2 member first receiving the Group-1NES will transmit a Network-in-Charge (NIC) signal with the Group-2 identifier. This signal will be relayed by any node, either Group-1 or Group-2, to other nodes that might not be in range of the initiating Group-1 member (mesh-network). The NIC signal takes precedence over other commands. Once a member of Groups-1 or -2 receive the NIC signal, they will all begin transmitting a Network Established Signal (NES) with Group-2 identifier and with the new Node-Count (sum of Group-1 and Group-2).

As other Groups approach, the same systematic approach to establishing a single Group will take place. Should groups have the same number of nodes, the tie-breaker will be the unique identifier of each node (similar to MAC address). The node with the lower numeric unique identifier will take control. In another embodiment, the higher numeric identifier might take control.

Simultaneous Flashing of Nodes

In systems of the present invention, a mesh network or "Master-Slave" network may be used to coordinate timing. Other modalities include GPS timing signals received via satellite, real-time clock modules, or cellular timing signals or timing signals from Universal Time Transmission (e.g. WWV Fort Collins, Colo. or similar government timing broadcast in Europe or Asia). The technical approach used includes establishing a common clock signal across the network. To simultaneously flash all lamps in the network, the new approach described in this document incorporates a fixed delay between sequence number in the network and the flash of the lamp. For example, using a 10-lamp network, node number 1 sends a signal to its most immediate neighbors defining a timing signal. It then waits 900 milliseconds to flash its lamp. Node number 2 hears the signal and waits 800 milliseconds to flash its lamp. Node number 3 hears the signal and waits 700 milliseconds to flash its lamp. This continues until lamp number 10 receives a clock signal and flashes immediately. The lowered number lamps all are staged to flash at the same time even without direct radio, infrared, ultrasound, or other media communication. Based upon this scheme, all 10 lamps will flash simultaneously. If 11 lamps are in the system, then node 11 will hear the signal from node 10 other nodes and delay its flash for 900 milliseconds. It will flash at the same time as node 1, which is the same as all the other nodes.

The net effect is that despite being out of range of all but one lamp, all the lamps will flash simultaneously; each lamp need not "hear" lamp number 1, or any other number lamp. Using an "association matrix" or neighbor table, each lamp must hear only 1 of the closest 8 lamps; that is, any one of 4 lamps with numbers greater than N or 4 lamps with numbers lower than N.

This is illustrated in Table 1 below:

TABLE 1

Association Table

| a) | ○ | ○ | ○ | ○ | N | ○ | ○ | ○ | ○ |
|---|---|---|---|---|---|---|---|---|---|
| b) | 1 | ○ | 1 | 1 | N | 1 | ○ | ○ | ○ |

In the above Association Matrix illustrated by line b) above, lamp N receives information from 3 lamps with lower sequence number and 1 lamp with higher sequence number. Any one of these lamps can provide the necessary information for lamp N to acquire timing and flash-delay data. Hence, lamp N need not be in range of lamp 1.

To dynamically establishing relative positioning, an "association matrix" or neighbor table is used to efficiently define the absence or presence of neighboring nodes.

Sequential Flashing

An alternative to multiple moving nodes (bicycles, vehicles, pedestrians) flashing lamps in unison is for the lamps to flash in a sequential order from last-in-line to first-in-line. This flash pattern will present a dynamic flashing "arrow" to approaching motorists. To accomplish this, each node must establish its physical location (position) relative to the other nodes. Furthermore, as one bicycle passes another, this position must change dynamically to renumber the nodes.

An alternative algorithm could use the combination of tail-lamp and head-lamp to communicate sequence number from trailing to leading nodes (bicycles, for example). Linking the tail-lamp and head-lamp would allow for a modulated signal to carry position and sequence information in the visible light spectrum, infrared spectrum, using high-frequency sound, or radio communication. The tail-lamp and head-lamp of any one bicycle or other vehicle or pedestrian would communicate with each other via radio (Bluetooth, Wi-Fi, for example), hard wire connection, sound, infrared light, etc. The node number would therefore be transmitted by visible light modulation or infrared-light modulation or sound or radio to the physically closest leading node and physically closest following node. The rear-most tail lamp would not receive a recognized signal from behind, and therefore, would assume the sequence position at the end of the peloton. The head-lamp would send position information to the next bicycle in line. This information would be received by the tail lamp ahead (using a photodetector, phototransistor, photodiode, LED acting as a photodiode when not flashing, etc.). The next member would continue to send its position information to the node ahead, and so on. This architecture would allow for rapid sequencing of multiple lamps. As moving nodes (pedestrians, bicyclists, vehicles) changed position, the new physical location would be established via node number transmitted and received from the tail-lamp and head-lamp.

Master-Slave

Alternatively, and depending upon size of the plastic enclosure of the lamp and length of antenna, a lower frequency (greater range) radio signal may be used. This will allow for deployment of a simple "Master-Slave" system where one node (bicycle) is designated as the Master, and all other nodes are "Slaves". At lower frequencies, the range of the Master will be adequate to control all Slaves within a 2 kilometer or greater range.

Dynamic Flashing Pattern

Once the individual nodes are "linked" by the mesh-network, Master-Slave, or Hybrid network, the rate of LED flash and pattern may be dynamically controlled. For example, with proximity detection using ultrasound, radar, laser reflection, head-light intensity, etc., a vehicle approaching from the rear of the group could be sensed and through microcontroller firmware embedded in the flashing lamp change the flash pattern. Changes could include longer duration duty cycle of flash, brighter flash, more rapid flash, etc. This would alert the approaching driver by providing dynamic patterns rather than a monotonous constant flashing pattern. For example, as the vehicle approaches, the simultaneous flashing of many bicycle tail lamps can increase in brightness and rapidity of flashing and ultimately become a "constant-on" or steady-burn illumination to make the bicyclists most visible. Alternatively, the color of the flashing tail-lamps could change from amber to red, or green, based upon proximity of an approaching vehicle. This dynamic response of the flash pattern to the approaching vehicle represents a novel and important safety feature.

Crowd Synchronized Behavior

Large groups of pedestrians (crowds) wearing devices that emit light or sound or other energy form can be coordinated in a similar fashion. Recent demonstrations of this crowd dynamic behavior have been seen in Olympic stadiums, where wrist bands or head lamps will flash with different color and patterns. In all the demonstrations, however, the coordinating signal is infrastructure dependent, that is, an infrared or radio signal is broadcast from a central location in close proximity to the crowd, and often in line-of-sight of the crowd. The "master" signal may be broadcast by several infrared light sources that are hard-wired to a central control system. In the proposed invention, coordination of crowd node behavior does not require a central infrastructure source or master signal. The control signal can be generated by any node and immediately control the behavior of all nodes in the network. For example, in a large football stadium with 100,000 fans, each carrying a low-cost node, a change of the electronic behavior of each node (LED color, flash rate, intensity, sound emission, etc.) can be coordinated by any single node in the crowd, if programmatically permitted, or by an administrator node sitting in the crowd. The same crowd can exit the stadium and synchronized, coordinated behavior would continue. There is no need for a high-energy, centrally located infrared or radio signal to be in line-of-sight of all the nodes.

Group Behavior Versus Individual Behavior

With successful linking of two or more bicycles, motorcycles, vehicles, pedestrians, etc. (nodes), the flash dynamics could be designed to change. For example, while solo riding, a bicycle taillight might flash for 100 milliseconds once per second. However, when "linked" to another bicycle via radio, infrared, light, or other signaling modality, the taillight might cease flashing and initiated a "Steady Burn" mode where both lamps (two bicycles) stays lit continuously. In a large group, simultaneous flashing might be annoying or less effective than steady illumination of the group. The group can choose one of many "patterns" that will become "default" once a group is formed, and this can be different than the flash pattern when an individual is riding solo. The lamp will have a solo mode and group mode, both programmable by the operator.

Although the invention is described with respect to pedestrians or vehicles which are "moving," it is to be appreciated that in some instances the movement of some or all of the pedestrians or vehicles may stop. For example, a group of pedestrians or cyclists traveling along a roadway may stop from time to time, and then subsequently resume movement. In some instances, the position indicating devices may remain on and may continue to emit their position indicating signals while the pedestrians or vehicles are stopped. In other instances, the position indicating devices may be turned off while the pedestrians or vehicles are stopped and may then be re-started when the pedestrians or vehicles subsequently resume movement. Also, the reference to moving pedestrians herein shall be construed to include not only pedestrians who are walking, jogging, standing or running but also persons who are performing actions or otherwise moving about within an area, such as workers or emergency personnel who are working in a construction zone or accident site on or near a roadway or other thoroughfare.

It is to be appreciated that, although the invention has been described hereabove with reference to certain examples or embodiments of the invention, various additions, deletions, alterations and modifications may be made to those described examples and embodiments without departing from the intended spirit and scope of the invention. For example, any elements, steps, members, components, compositions, reactants, parts or portions of one embodiment or example may be incorporated into or used with another embodiment or example, unless otherwise specified or unless doing so would render that embodiment or example unsuitable for its intended use. Also, where the steps of a method or process have been described or listed in a particular order, the order of such steps may be changed unless otherwise specified or unless doing so would render the method or process unsuitable for its intended purpose. Additionally, the elements, steps, members, components, compositions, reactants, parts or portions of any invention or example described herein may optionally exist or be utilized in the absence or substantial absence of any other element, step, member, component, composition, reactant, part or portion unless otherwise noted. All reasonable additions, deletions, modifications and alterations are to be considered equivalents of the described examples and embodiments and are to be included within the scope of the following claims.

What is claimed is:

1. A system comprising a plurality of wearable signal emitting devices which comprise:
   a wearable article comprising a wearable garment, vest, shoe, running shoe, headgear, cap, hat, helmet, hard hat, strap, leg strap, arm strap, belt, back-pack, lanyard, jewelry, ear ring, necklace or wrist band; and
   a position indicating device attached to or integrated in the wearable article;
wherein the position indicating device comprises at least one emitter which emits a position indicating signal; a receiver; a power source; and electronic circuitry; and
wherein input signal(s) are received via the receiver and the electronic circuitry causes the position-indicating signals emitted by the emitter to change in response to the receipt of one or more input signal(s);
wherein each device is are configured to transmit a synchronization signal to other devices located within a synchronization range of that device;
wherein the electronic circuitry of each device uses received synchronization signals to cause its signal emitter to emit position indicating signals which are synchronized with those emitted by others of said devices located within said synchronization range; and
wherein each device begins to emit synchronized position indicating signals when it moves into said synchronization range and ceases to emit synchronized position indicating signals when it moves out of said synchronization range.

2. A system according to claim 1 wherein said at least one emitter emits a position indicating signal that is directional, omni-directional, or quasi-directional.

3. A system according to claim 1 wherein said at least one emitter emits a position indicating signal that comprises electromagnetic radiation.

4. A system according to claim 3 wherein the electromagnetic radiation is selected from: visible, invisible, infrared, ultraviolet, microwave, or radio frequency radiation.

5. A system according to claim 1 further comprising global positioning system (GPS) receiver.

6. A system according to claim 5 wherein the GPS receiver receives a radio clock signal transmitted by government or standards agency and wherein the electronic circuitry is configured to determine its current position based on said radio clock signal.

7. A system according to claim 5 further comprising a transmitter for transmitting its current position.

8. A system according to claim 7 wherein the transmitter transmits the device's current position such that its current position is indicated on a GPS display or other mapping system.

9. A system according to claim 1 further configured to sense proximity of an oncoming vehicle and to cause the position indicating signal to change in response to the sensed proximity of the oncoming vehicle.

10. A system according to claim 9 wherein proximity of an oncoming vehicle is sensed by ultrasound, radar, laser reflection or head-light intensity.

11. A system according to claim 9 wherein the emitter emits visible light which increases in intensity, changes in intensity or changes in color in response to sensed proximity of an oncoming vehicle.

12. A system according to claim 11 wherein the emitter emits flashes of light which become more rapid or become continuous in response to sensed proximity of an oncoming vehicle.

13. A system according to claim 1 wherein the synchronization signal transmitter is of a type selected from: radiofrequency transmitters, Bluetooth transmitters, WiFi transmitters, electrical hard wire connections, visible light transmitters, infra-red light transmitters, light pulse transmitters, LiDAR devices, sound transmitters, speakers, percussion emitters, ultrasound transmitters, radar devices, short range radar (SRR) devices, medium range radar (MRR) devices, long range radar (LRR) devices, moving apparatus detectable by motion sensors or motion detectors and transmitters which transmit photonic images detectable by cameras.

14. A system according to claim 1 wherein the devices operate as a mesh network when within said synchronization range.

15. A system according to claim 1 wherein a device that moves out of said synchronization range either stops emitting any positioning signal or begins to emit non-synchronized position indicating signal.

16. A system according to claim 1 wherein the signal emitters of devices located within said synchronization range emit flashes of light in a synchronized format selected from:
- flashes of light in sequence progressing from a first-positioned device to a last-positioned device;
- flashes of light in sequence progressing from a last-positioned device to a first-positioned device;
- flashes of light in unison;
- continuous light in unison;
- flashes of light in predetermined flashing pattern;
- flashes of light in predetermined color pattern; and
- concurrent flashes of light from pairs of said devices within said synchronization range.

17. A system according to claim 1 wherein the devices emit position indicating signals of a type selected from: visible or infrared light, constant visible or infrared light, blinking, flashing or intermittent visible or infrared light, a particular pattern of blinking, flashing or intermittent visible or infrared light, light of changing colors, sound, constant sound, intermittent sound, a particular pattern of intermittent sound and sound of changing volume, pitch, type or character.

18. A system comprising a plurality of wearable signal emitting devices wherein each devices comprises:
- a wearable article comprising a wearable garment, vest, shoe, running shoe, headgear, cap, hat, helmet, hard hat, strap, leg strap, arm strap, belt, back-pack lanyard, jewelry, ear ring, necklace or wrist band; and
- a position indicating device attached to or integrated in the wearable article;
- wherein the position indicating device comprises at least one emitter which emits a position indicating signal: a receiver; a power source; and electronic circuitry; and
- wherein input signal(s) are received via the receiver and the electronic circuitry causes the position-indicating signals emitted by the emitter to change in response to the receipt of one or more input signal(s); and
- wherein each device is configured to transmit a synchronization signal to other devices located within a synchronization range of that device;
- wherein the electronic circuitry of each device uses received synchronization signals to cause its signal emitter to emit position indicating signals which are synchronized with those emitted by others of said devices located within said synchronization range; and
- wherein each device also comprises:
- an antenna configured to receive and transmit a radio frequency (RF) signal or photodetectors and transmitters to provide visible or infrared light modulated communication, computer hardware comprising a microcontroller configured to perform instruction stored in memory, a RF transceiver or photodetectors configured to transmit and receive messages from the microcontroller, and a power source; and
- memory comprising a neighbor table including a timing indicator of neighbor modules, the timing indicator indicating a latency before emitting the warning signal with respect to a network-coordinated clock;
- wherein the computer hardware is configured to share timing and a relative position data to at least modules in its neighbor table, the relative position at least in part based on the proximity indicator, the timing and relative position data used to synchronize simultaneous emission of the warning signal with at least the modules in its neighbor table.

* * * * *